United States Patent
Katagiri et al.

(10) Patent No.: US 7,022,413 B2
(45) Date of Patent: Apr. 4, 2006

(54) AROMATIC LIQUID CRYSTALLINE POLYESTER FILM

(75) Inventors: Shiro Katagiri, Tsukuba (JP); Satoshi Okamoto, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/924,824

(22) Filed: Aug. 25, 2004

(65) Prior Publication Data
US 2005/0085618 A1   Apr. 21, 2005

(30) Foreign Application Priority Data
Aug. 28, 2003  (JP)  ............... 2003-209253

(51) Int. Cl.
  B32B 27/36   (2006.01)
  C08F 20/00   (2006.01)
  C08K 5/02    (2006.01)
(52) U.S. Cl. .............. 428/480; 525/444; 524/792; 524/841; 264/212; 264/216; 252/299.01; 252/299.5
(58) Field of Classification Search ............... 525/444; 524/792, 841; 428/480; 264/212, 216; 252/299.01, 252/299.5
See application file for complete search history.

(56) References Cited

U.S. PATENT DOCUMENTS 5,262,473 A * 11/1993 Cottis et al. ............... 524/537
5,804,634 A * 9/1998 Umetsu et al. ............. 524/466
6,797,345 B1 * 9/2004 Okamoto et al. ............ 428/1.6
6,838,546 B1 * 1/2005 Okamoto et al. ............ 528/495

* cited by examiner

Primary Examiner—Samuel A. Acquah
(74) Attorney, Agent, or Firm—Sughrue Mion, PLLC

(57) ABSTRACT

The present invention provides an aromatic liquid crystalline polyester film excellent in the adhesion property to a substrate. Such film is obtained by an aromatic liquid crystalline polyester film obtained by casting an aromatic liquid crystalline polyester solution composition containing a solvent containing a halogen-substituted phenol defined by the following general formula (I):

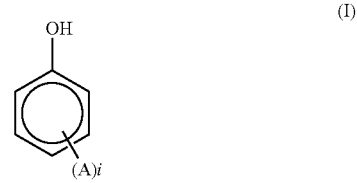

(wherein A is a halogen atom or a trihalomethyl group; i is an integer of 1 to 5; and in the case i is 2 or higher, the respective A may be the same or different), an aromatic liquid crystalline polyester, and a non-liquid crystalline resin at ratio of 1 to 200 parts by weight of the non-liquid crystalline resin to 100 parts by weight of the aromatic liquid crystalline polyester on a substrate; and removing the solvent.)

10 Claims, No Drawings

AROMATIC LIQUID CRYSTALLINE POLYESTER FILM

BACKGROUND OF THE INVENTION

1. Field of the Invention

The present invention relates to an aromatic liquid crystalline polyester film.

2. Background of the Invention

Aromatic liquid crystalline polyester has been widely used for precision parts of electronic devices such as connectors obtained by injection molding, since liquid crystalline polyester shows low moisture absorption, excellent dielectric property at high frequency, heat resistance, and mechanical strength. Recently, it is explored that a film of aromatic liquid crystalline polyesters molded by extrusion process or tubular process in used for insulating films of multi-layer printed wiring boards or flexible printed wiring board.

However, the film of aromatic liquid crystalline polyester produced by extrusion process or tubular process has large anisotropy, resulting in weak tear strength along the direction perpendicular to the flow direction during molding and film handling, and resulting in easily tearing the film.

Accordingly, it is proposed that an aromatic liquid crystalline polyester film is obtained by casting an aromatic liquid crystalline polyester solution composition containing an aromatic liquid crystalline polyester and a halogen-substituted phenol on a substrate and removing the solvent (JP 2002-114894 A). However in the case where the polyester film is laminated on a substrate of a metal foil such as a copper foil or a resin film, it is still desired to improve the adhesion between the polyester film and the substrate.

SUMMARY OF THE INVENTION

The object of the present invention is to provide an aromatic liquid crystalline polyester film excellent in adhesion to a substrate.

According to the results of intensive investigations, inventors of the present invention have found that an aromatic liquid crystalline polyester film obtained from an aromatic liquid crystalline polyester solution composition containing a non-liquid crystalline resin 1 to 200 parts by weight to an aromatic liquid crystalline polyester 100 parts by weight is excellent in the adhesion to a substrate and accordingly have accomplished the present invention.

That is, the present invention provides an aromatic liquid crystalline polyester film obtained by casting an aromatic liquid crystalline polyester solution composition comprising a solvent containing a halogen-substituted phenol represented by the following formula (I):

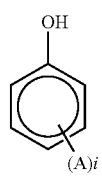

(I)

(wherein A is a halogen atom or a trihalomethyl group; i is an integer of from 1 to 5; and in the case where i is 2 or higher, the respective A may be the same or different), an aromatic liquid crystalline polyester, and a non-liquid crystalline resin at ratio of 1 to 200 parts by weight of the non-liquid crystalline resin to 100 parts by weight of the aromatic liquid crystalline polyester on a substrate; and removing the solvent.

PREFERRABLE EMBODIMENT OF THE INVENTION

An aromatic liquid crystalline polyester film of the present invention can be obtained by casting an aromatic liquid crystalline polyester solution composition comprising a solvent containing a halogen-substituted phenol represented by the above-mentioned formula (I), an aromatic liquid crystalline polyester, and a non-liquid crystalline resin at ratio of 1 to 200 parts by weight of the non-liquid crystalline resin to 100 parts by weight of the aromatic liquid crystalline polyester on a substrate; and removing the solvent.

The aromatic liquid crystalline polyester used in the present invention is a polyester so-called thermotropic liquid crystalline polymer, and shows optical anisotropy in melting at temperature of 450° C. or lower.

The aromatic liquid crystalline polyester include, for example:

(1) a polyester comprising a repeating unit derived from aromatic hydroxycarboxylic acids, a repeating unit derived from aromatic dicarboxylic acids and a repeating unit derived from an aromatic diols, (2) a polyester comprising repeating units derived from different aromatic hydroxycarboxylic acids, (3) a polyester comprising a repeating unit derived from aromatic dicarboxylic acids and a repeating unit derived from aromatic diols, (4) a polyester prepared by reaction of polyesters such as polyethylene terephthalate with aromatic hydroxycarboxylic acids; and the like.

In place of such aromatic hydroxycarboxylic acids, aromatic dicarboxylic acids or aromatic diols, ester formable derivatives thereof such as derivatives having ester forming property may be used to obtain the above polyester.

The ester formable derivatives of a carboxylic acid may include, for example, those in which a carboxyl group is present in the form of an acid chloride or an acid anhydride so as to promote an ester formation reaction with high reactivity, or those in which a carboxyl group forms an ester with alcohols, ethylene glycol and the like so that a polyester is formed by a transesterification reaction.

The ester formable derivatives of a phenolic hydroxyl group may include, for example, those in which a phenolic hydroxyl group forms an ester with carboxylic acids so that polyester is formed by a transesterification reaction.

Aromatic hydroxycarboxylic acids, aromatic dicarboxylic acids and aromatic diols may also be substituted with a halogen atom such as chlorine, fluorine and the like, an alkyl group such as a methyl group, ethyl group and the like, an aryl group such as a phenyl group and the like, or other groups not disturbing their ester forming property. Examples of repeating units constituting the aromatic liquid crystalline polyester include the following units.

Repeating units derived from aromatic hydroxycarboxylic acids:

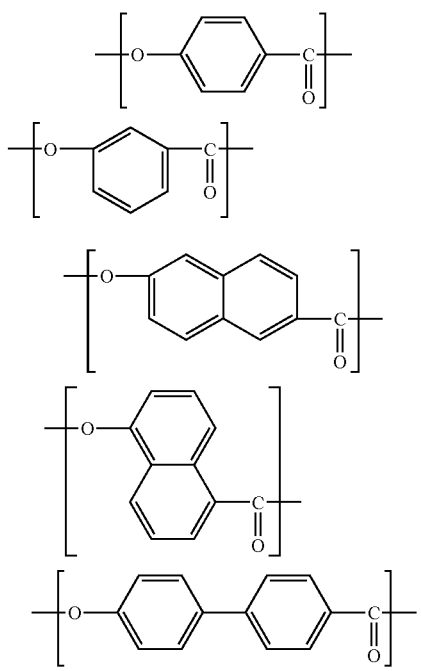

The above-mentioned repeating units may be substituted with a halogen atom or an alkyl group.

Repeating units derived from aromatic dicarboxylic acids:

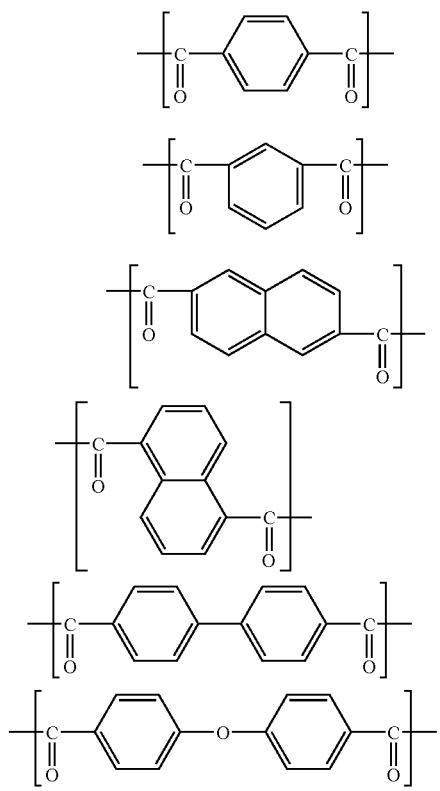

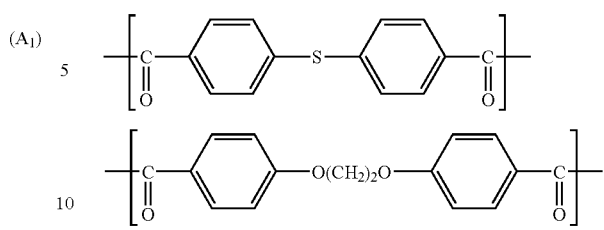

The above-mentioned repeating units may be substituted with a halogen atom, an alkyl group or an aryl group.

Repeating units derived from aromatic diols:

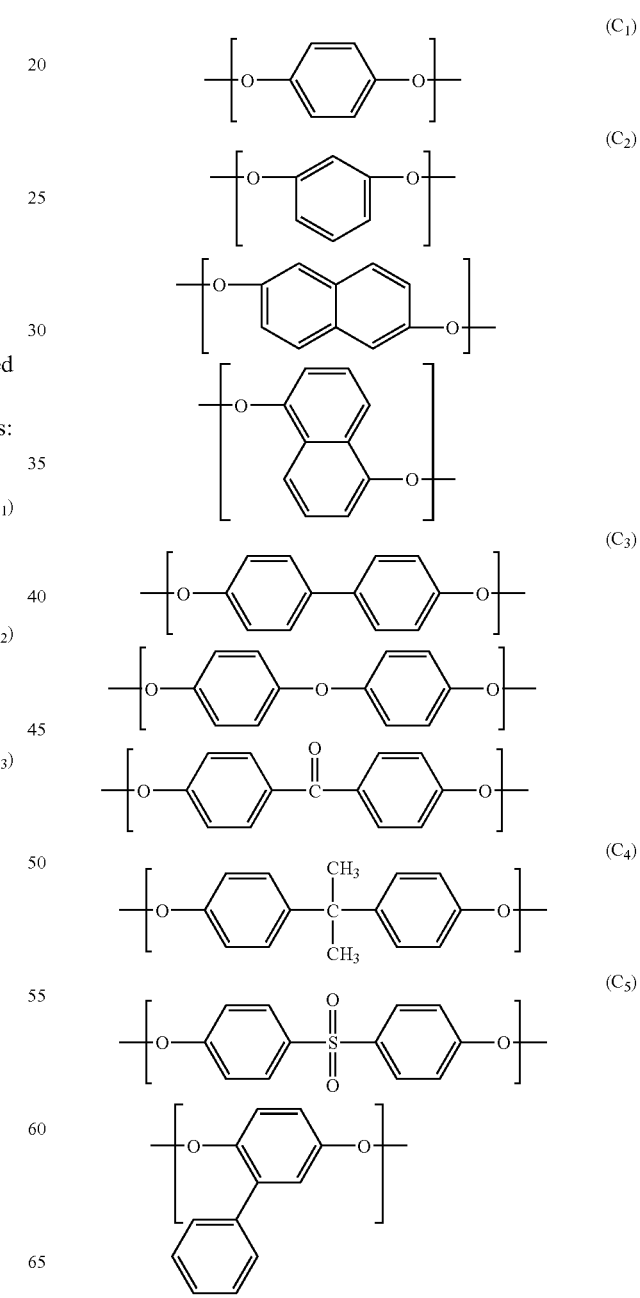

The above-mentioned repeating units may be substituted with a halogen atom, an alkyl group or an aryl group.

Among the above-mentioned alkyl group, alkyl group having 1 to 10 carbon atoms are preferable, and among the above-mentioned aryl group, aryl group having 6 to 20 carbon atoms are preferable.

Examples of the alkyl group having 1 to 10 carbon atoms are a methyl group, an ethyl group, and a butyl group and examples of the aryl group having 6 to 20 carbon atoms are a phenyl group and a benzyl group.

From a viewpoint of good balance of heat resistance and mechanical properties, preferable are aromatic liquid crystalline polyesters containing at least 30% of the repeating unit of the above-described formula $A_1$.

Those having combinations of the repeating units as following (a) to (f) are preferable.

(a): a combination of ($A_1$), ($B_2$), and ($C_3$), a combination of ($A_2$), ($B_2$) and ($C_3$), a combination of ($A_1$), a mixture of ($B_1$) and ($B_2$), and ($C_3$), or a combination of ($A_2$), a mixture of ($B_1$) and ($B_2$), and ($C_3$)

(b): the combination in which ($C_3$) is partly or wholly replaced with ($C_1$) in each combination of above (a).

(c): the combination in which ($C_3$) is partly or wholly replaced with ($C_2$) in each combination of above (a).

(d): the combination in which ($C_3$) is partly or wholly replaced with ($C_4$) in each combination of above (a).

(e): the combination in which ($C_3$) is partly or wholly replaced with a mixture of ($C_4$) and ($C_5$) in each combination of above (a).

(f): the combination in which ($A_1$) is partly replaced with ($A_2$) in each combination of above (a).

From the viewpoint of a heat resistance, the preferable aromatic liquid crystalline polyesters are those comprising 30 to 80 mol % of a repeating unit derived from p-hydroxybenzoic acid or 2-hydroxy-6-naphthoic acid, 10 to 35 mol % of a repeating unit derived from at least one compound selected from the group consisting of hydroquinone and 4,4'-dihydroxybiphenyl, and 10 to 35 mol % of a repeating unit derived from at least one compound selected from the group consisting of terephthalic acid and isophthalic acid.

The weight average molecular weight of the aromatic liquid crystalline polyester is not particularly limited, and preferably from 10,000 to 100,000.

The method of producing the aromatic liquid crystalline polyester used in the present invention is not particularly limited and may include, for example, a method in which at least one compound selected from the group consisting of aromatic hydroxycarboxylic acids and aromatic diols is acylated with an excess amount of a fatty acid anhydride to obtain an acylated compound, and by transesterification between the acylated compound and at least one compound selected from the group consisting of aromatic hydroxycarboxylic acids and aromatic dicarboxylic acids, the aromatic liquid crystalline polyester is produced. As the acylated compound, fatty acid esters obtained by previous acylation may also be used.

In acylation reaction, the used amount of a fatty acid anhydride is preferably from 1.0 to 1.2 times equivalent, more preferably from 1.05 to 1.1 times equivalent, to that of the phenolic hydroxyl group. If the amount of the fatty acid anhydride is less than 1.0 times equivalent, at the time of the ester interchange (condensation polymerization), sublimation of the acylated compound, aromatic hydroxy carboxylic acids, and aromatic dicarboxylic acids may occur during transesterification (polycondensation) and clogging of the piping of such as reaction vessel may occur.

If the adding amount of fatty acid anhydride is more than 1.2 equivalents, coloring of resultant aromatic liquid crystalline polyester may be more significant.

The acylation reaction is preferably carried out at about 130 to about 180° C. for about 5 minutes to about 10 hours, more preferably at about 140 to about 160° C. for about 10 minutes to about 3 hours.

The fatty acid anhydride to be used for the acylation reaction is not particularly limited, and include, for example, acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, and β-bromopropionic anhydride, and they may be use in form of mixtures of two or more of them. From a viewpoint of its cost and easy handling, acetic anhydride, propionic anhydride, butyric anhydride, and isobutyric anhydride are preferable and acetic anhydride is more preferable.

In transesterification, the amount of an acyl group in acylated compound is preferably 0.8 to 1.2 times equivalent to a carboxyl group.

Transesterification is preferably conducted while raising temperature from about 130 to about 400° C. at a rate of 0.1 to 50° C./min, and more preferably conducted while raising temperature from about 150 to about 350° C. at a rate of 0.3 to 5° C./min.

In transesterification of a carboxylic acid with a ester of fatty acid obtained by acylation, it is preferred that a fatty acid generated as a by-product and unreacted fatty acid anhydride are distilled off by means of a usual method such as distillation for the purpose of shifting the equilibrium.

The acylation reaction and transesterification may also be conducted in the presence of a catalyst. As the catalyst, those conventionally known as a catalyst for polymerization of a polyester can be used, and examples thereof include metal salt catalysts such as magnesium acetate, stannous acetate, tetrabutyl titanate, lead acetate, sodium acetate, potassium acetate, antimony trioxide and the like, organic compound catalysts such as N,N-dimethylaminopyridine, N-methylimidazole and the like. These catalysts are usually charged at the time of charging monomers, and are not necessarily removed after acylation, and when the catalysts are not removed, they can be used for transesterification.

Though polycondensation by transesterification is usually conducted by melt polymerization, melt polymerization and solid-phase polymerization may be used together. It is preferable, in solid-phase polymerization, that a polymer is extracted from a melt polymerization process, then, ground into powder form or flake form, and subjected to a known solid-phase polymerization method. For example, a method for solid-phase polymerization include a method in which heat-treatment is conducted in solid phase at about 20 to about 350° C. under an inert atmosphere such as nitrogen for 1 to 30 hours. Solid-phase polymerization may be conducted while stirring, or conducted in static condition without stirring. Further, melt polymerization and solid-phase polymerization may also be conducted in the same reaction vessel by providing a suitable stirring mechanism. After solid-phase polymerization, the resulted aromatic liquid crystalline polyester can be pelletized and molded by known methods.

Production of aromatic liquid crystalline polyester can be conducted using, for example, a batch-wise apparatus, continuous apparatus and the like.

The solvent to be used for the present invention contains the halogen-substituted phenol represented by the following formula (1).

From the viewpoint where a solvent to be used easily dissolves aromatic liquid crystalline polyester at room temperature or in the heating state, a preferable solvent used in the present invention is a mixture containing a halogen-substituted phenolic compound represented by the following formula (1), more preferable is a mixture containing 30 weight % or more of a halogen-substituted phenolic compound with respect to the amount of the mixture, further preferable is a mixture containing 60 weight % or more of the phenolic compound, and most preferable is using substantially 100 weight % of the phenolic compound as the solvent.

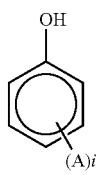

(I)

In the formula, A is a halogen atom or a trihalomethyl group; i is an integer of 1 to 5; and in the case i is 2 or higher, the respective A may be the same or different and preferably the same.

A halogen atom includes a fluorine atom, a chlorine atom, a bromine atom and an iodine atom, preferably a fluorine atom and a chlorine atom, and particularly preferably a chlorine atom.

An example of the general formula (1) in which a halogen atom is a fluorine atom includes pentafluorophenol, tetrafluorophenol and the like.

An example of the general formula (1) in which a halogen atom is a chlorine atom includes o-chlorophenol and p-chlorophenol, preferably p-chlorophenol from the viewpoint of solubility.

A halogen of the trihalogenated methyl group include a fluorine atom, a chlorine atom, a bromine atom and an iodine atom.

An example of the general formula (1) in which a halogen of the trihalogenated methyl group is a fluorine atom includes 3,5-bistrifluoromethyl phenol.

The solvent to be used is preferably a solvent containing 30 weight % or more of a chlorine-substituted phenolic compound such as o-chlorophenol and p-chlorophenol from the viewpoint of costs and availability, more preferably a solvent containing 30 weight % or more of p-chlorophenol from the viewpoint of solubility.

Other components except a halogen-substituted phenolic compound may be contained in the solvent to the extent that aromatic liquid crystalline polyester is not precipitated in the conserving of the solution or the after-mentioned casting.

Other components optionally contained are not particularly limited; for example, including a compound having chlorine such as chloroform, methylene chloride and tetrachloroethane, and the like.

The aromatic liquid crystalline polyester solution composition can be obtained by dissolving an aromatic liquid crystalline polyester, and a non-liquid crystalline resin in the solvent mentioned above.

The content of the aromatic liquid crystalline polyester is preferably from 0.5 to 100 parts by weight in the solvent containing the halogen-substituted phenol (I); from a viewpoint of the workability and economical property, it is more preferably from 1 to 50 parts by weight, and further more preferably from 5 to 15 parts by weight. If it is less than 0.5 parts by weight, production efficiency may be deteriorated, and if it exceeds 100 parts by weight, solubility may be decreased.

The content of non-liquid crystalline resin is from 1 to 200 parts by weight to 100 parts by weight of the aromatic liquid crystalline polyester resin and preferably from 5 to 50 parts by weight, and more preferably from 10 to 30 parts by weight. If the content is less than 1 part by weight, the adhesion property to a substrate such as a metal foil or a base material of a resin film or the like is not improved and if the content exceeds 200 parts by weight, the dielectric property (a low dielectric loss tangent) and soldering heat resistance of the obtained film tend to be deteriorated.

The non-liquid crystalline resin include, for example, polyarylate, polyether imide, polycarbonate, polyphenylene ether, polysulfone, polyethylene terphthalate, polybutylene terephthalate, poly(1,4-cyclohexylenedimethylene) terephthalate, and polyethylene 2,6-naphthalate and their mixture.

Among them, polyarylate, polyether imide, polyethylene terphthalate, and polyethylene 2,6-naphthalate are preferably used, and polyarylate and polyester imide are more preferably used, and polyarylate is further more preferably used.

In this case, the polyarylate may be obtained by polymerization of bisphenol, isophthalic acid chloride, and terephthalic chloride.

The aromatic liquid crystalline polyester solution composition may contain one or more additives, for example, an inorganic filler such as silica, aluminum hydroxide, and calcium carbonate; a high dielectric filler such as barium titanate and strontium titanate; a whisker such as potassium titanate and aluminum borate; an organic filler such as a cured epoxy resin, a cross-linked benzoguanamine resin, and a cross-linked acrylic polymer; a silane coupling agent; an antioxidant; a UV absorbent; and the like.

The aromatic liquid crystalline polyester solution composition is preferable to be used after small foreign substances contained in the solution composition are removed by filtration by a filter or the like.

The aromatic liquid crystalline polyester film of the present invention can be obtained by casting the aromatic liquid crystalline polyester solution composition on a substrate such as a glass substrate and a metal substrate and then removing the solvent.

The method for removing the solvent is not particularly limited, and it is preferable to remove the solvent by evaporation. The method for evaporating the solvent include heating, decreasing pressure, ventilation, or the like.

The temperature of removing solvent is preferably about 80° C. or higher and about 180° C. or lower, more preferably about 100° C. or higher and about 160° C. or lower. If it is lower than 80° C., the solvent may not be removed efficiently and if it is higher than 180° C., the adhesion property to the substrate may be deteriorated and unevenness or blister on the surface of film may occur.

The aromatic liquid crystalline polyester film obtained in the above-mentioned manner is preferably subjected to further heating treatment for the purpose of improving the properties such as film strength or the like.

The temperature of the heating treatment is preferably about 200 to about 400° C. and more preferably about 250° C. to about 330° C.

Since the aromatic liquid crystalline polyester film obtained in such a manner is excellent in the adhesion property to a metal foil such as a copper foil and a base material of a resin film, the film can be advantageously usable for a semiconductor package obtained by build-up process or the like, a multilayer printed wiring board for a mother board, a flexible circuit wiring board, a film for a tape-automated bonding, an embedded substrate and the like.

EXAMPLES

Hereinafter, the present invention will be described more particularly along with Examples, however the present invention is not limited to these Examples.

Example 1

To a reactor provided with a stirrer, a torque meter, a nitrogen gas introduction tube, a thermometer, and a refluxing cooling apparatus, 2-hydroxy-6-naphthoic acid 128 g (0.68 mole), 4,4'-dihydoxybiphenyl 63.6 g (0.34 mole), isophthalic acid 56.5 g (0.34 mole) and acetic anhydride 152.7 g (1.50 mole) were added. After the atmosphere inside of the reactor was sufficiently replaced with nitrogen gas, the mixture was heated to 150° C. in 15 minutes under nitrogen gas refluxing condition and the temperature was kept, the mixture was refluxed for 3 hours.

After then, while the acetic acid produced as a byproduct and the unreacted acetic anhydride were being removed, the reaction solution was heated to 320° C. in 170 minutes and the time when the torque increase was found was considered to be the moment of the completion of the reaction, the content was taken out. The obtained solid matter was cooled to a room temperature and pulverized by a coarse pulverizer and kept at 250° C. for 3 hours under nitrogen atmosphere to promote polymerization reaction in solid phase and obtain an aromatic liquid crystal polyester powder. The obtained powder was found having particular Schlielen patterns in the liquid crystal phase at 350° C. by a polarizing microscope.

The obtained powder 0.4 g was compressed-molded at 250° C. for 10 minutes under 100 kg load by using a flow tester CFT-500 manufactured by Shimadzu Corporation to obtain a 3 mm-thick disk specimen. Using the specimen, the water absorption at 85° C./85% RH for 168 hours by a constant temperature and constant humidity apparatus ADVANTEC AGX-model manufactured Toyo Engineering Works. was measured to find that the water absorption was 0.1% or lower.

9 g of the aromatic liquid crystalline polyester powder obtained in the above-mentioned process and 1 g of polyarylate (U 100, manufactured by Unitika Ltd.) were added to 90 g of a halogen atom-substituted phenol compound (p-chlorophenol) solvent and dissolved at 120° C. for 8 hours to completely dissolve in the solvent and obtain a transparent aromatic liquid crystalline polyester solution composition.

The solution was casting on a copper foil as a substrate and the solvent was evaporated under condition of 150° C. for 10 minutes by a hot plate to obtain a laminate film of copper foil and aromatic liquid crystalline polyester with a thickness 25 µm of the aromatic liquid crystalline polyester layer and further the film was subjected to heating treatment at 320° C. for 60 minutes by a hot air type drier. In such a manner, 2 sheets of the aromatic liquid crystalline polyester film were obtained and both of the aromatic liquid crystalline polyester films were laminated on each other and pressed at 250° C. and 5 MPa for 30 minutes by a high temperature press method.

The adhesion strength of the aromatic liquid crystalline polyester film/aromatic liquid crystalline polyester film was evaluated to find that the adhesion strength was 1.0 N/mm (180° direction peeling).

Further, with respect to the soldering heat resistance, in the case the aromatic liquid crystalline polyester film was dipped in a solder bath at 320° C. for 10 seconds, no appearance change was observed.

Further, 0.4 g of the obtained aromatic liquid crystalline polyester film was compressed-molded at 250° C. for 10 minutes under 100 kg load by using a flow tester CFT-500 manufactured by Shimadzu Corporation to obtain a 3 mm-thick disk specimen. Using the specimen, the dielectric loss tangent was measured by using a HP impedance analyzer manufactured by Hewlett-Packard Development Co. LP. to find it was 0.0012 (1 GHz).

Example 2

5 g of the aromatic liquid crystalline polyester powder obtained in Example 1 and 5 g of polyarylate (U 100, manufactured by Unitika Ltd.) were added to 90 g of a halogen-substituted phenol compound (p-chlorophenol) solvent and dissolved at 130° C. for 8 hours to completely dissolve in the solvent and obtain a transparent aromatic liquid crystalline polyester solution composition.

The solution was casting on a copper foil as a substrate and the solvent was evaporated under condition of 150° C. for 10 minutes by a hot plate to obtain a laminate film of copper foil and aromatic liquid crystalline polyester with a thickness 25 µm of the aromatic liquid crystalline polyester layer and further the film was subjected to heating treatment at 320° C. for 60 minutes by a hot air type drier. In such a manner, 2 sheets of the aromatic liquid crystalline polyester film were obtained and both of the aromatic liquid crystalline polyester films were laminated on each other and pressed at 250° C. and 5 MPa for 30 minutes to stick them together.

The adhesion strength of the aromatic liquid crystalline polyester film/aromatic liquid crystalline polyester film was evaluated to find that the adhesion strength was 1.0 N/mm (180° direction peeling).

Further, with respect to the soldering heat resistance, in the case the aromatic liquid crystalline polyester film was dipped in a solder bath at 320° C. for 10 seconds, no appearance change was observed.

Further, 0.4 g of the obtained aromatic liquid crystalline polyester film was compressed-molded at 250° C. for 10 minutes under 100 kg load by using a flow tester CFT-500 manufactured by Shimadzu Corporation to obtain a 3 mm-thick disk specimen. Using the specimen, the dielectric loss tangent was measured by a HP impedance analyzer manufactured by Hewlett-Packard Development Co. LP. to find it was 0.0042 (1 GHz).

Comparative Example 1

The aromatic liquid crystalline polyester powder 10 g obtained in Example 1 was added to a halogen-substituted phenol compound (p-chlorophenol) solvent 90 g and dissolved at 130° C. for 8 hours to completely dissolve in the solvent and obtain a transparent aromatic liquid crystalline polyester solution composition.

The solution casting on a copper foil as a substrate and the solvent was evaporated under condition of 150° C. for 10 minutes by a hot plate to obtain a laminate film of copper foil and aromatic liquid crystalline polyester with a thickness 25 μm of the aromatic liquid crystalline polyester layer and further the film was subjected to heating treatment at 320° C. for 60 minutes by a hot air type drier. In such a manner, 2 sheets of the aromatic liquid crystalline polyester film were obtained and both of the aromatic liquid crystalline polyester films were laminated on each other and pressed at 250° C. and 5 MPa for 30 minutes to stick them together.

The adhesion strength of the aromatic liquid crystalline polyester film/aromatic liquid crystalline polyester film was evaluated to find that the adhesion strength was 0.1 N/mm or less (180° direction peeling).

Further, with respect to the soldering heat resistance, in the case the obtained laminate film of copper foil and aromatic liquid crystalline polyester was dipped in a solder bath at 320° C. for 10 seconds, no appearance change was observed.

Further, 0.4 g of an aromatic liquid crystalline polyester film obtained by removing the copper foil from the laminate film of copper foil and obtained aromatic liquid crystalline polyester was compressed-molded at 250° C. for 10 minutes under 100 kg load by using a flow tester CFT-500 manufactured by Shimadzu Corporation to obtain a 3 mm-thick disk specimen. Using the specimen, the dielectric loss tangent was measured by a HP impedance analyzer manufactured by Hewlett-Packard Development Co. LP to find it was 0.0010 (1 GHz).

The present invention provides an aromatic liquid crystalline polyester film excellent in the adhesion property to a substrate.

What is claimed is:

1. An aromatic liquid crystalline polyester film obtained by casting an aromatic liquid crystalline polyester solution composition comprising a solvent containing a halogen-substituted phenol represented by the following formula (I):

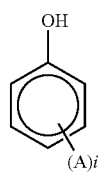

wherein A is a halogen atom or a trihalomethyl group; i is an integer of 1 to 5; and in the case i is 2 or higher, the respective A may be the same or different), an aromatic liquid crystalline polyester, and a non-liquid crystalline resin at ratio of from 1 to 200 parts by weight of the non-liquid crystalline resin to 100 parts by weight of the aromatic liquid crystalline polyester on a substrate; and removing the solvent, wherein the non-liquid crystalline resin is polyarylate.

2. The polyester film according to claim 1, wherein the content of the non-liquid crystalline resin is 5 to 50 parts by weight.

3. A method for producing an aromatic liquid crystalline polyester film comprising a step of casting on a substrate an aromatic liquid crystalline polyester solution which comprises a solvent containing a halogen-substituted phenol represented by the formula (I), an aromatic liquid crystalline polyester, and a non-liquid crystalline resin at ratio of from 1 to 200 parts by weight of the non-liquid crystalline resin to 100 parts by weight of the aromatic liquid crystalline polyester; wherein the non-liquid crystalline resin is polyarylate and a step of removing the solvent.

4. An aromatic liquid crystalline polyester solution composition comprising a solvent containing a halogen-substituted phenol represented by the following formula (I):

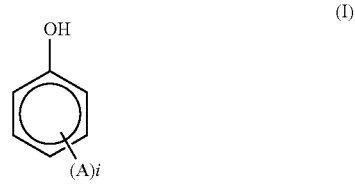

(wherein A is a halogen atom or a trihalomethyl group; i is an integer of 1 to 5; and in the case i is 2 or higher, the respective A may be the same or different), an aromatic liquid crystalline polyester, and a non-liquid crystalline resin at ratio of from 1 to 200 parts by weight of the non-liquid crystalline resin to 100 parts by weight of the aromatic liquid crystalline polyester, wherein the non-liquid crystalline resin is polyarylate.

5. The polyester solution composition according to claim 4, wherein the polyarylate is an amorphous polyarylate.

6. The polyester solution composition according to claim 4, wherein the polyarylate is an wholly aromatic polyarylate.

7. The polyester solution composition according to claim 4, wherein the polyarylate is a polyarylate obtained from bisphenol, an isophthalic derivative and a terephthalic derivative.

8. The polyester film according to claim 1, wherein the polyarylate is an amorphous polyarylate.

9. The polyester film according to claim 1, wherein the polyarylate is an wholly aromatic polyarylate.

10. The polyester film according to claim 1, wherein the polyarylate is a polyarylate obtained from bisphenol, an isophthalic derivative and a terephthalic derivative.

* * * * *